United States Patent
Yamazaki et al.

(10) Patent No.: US 11,358,648 B2
(45) Date of Patent: Jun. 14, 2022

(54) VEHICLE SIDE BODY STRUCTURE

(71) Applicant: Mazda Motor Corporation, Hiroshima (JP)

(72) Inventors: Tadashi Yamazaki, Hiroshima (JP); Takeshi Nakamura, Hiroshima (JP); Toshiyuki Gendo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 207 days.

(21) Appl. No.: 16/819,433

(22) Filed: Mar. 16, 2020

(65) Prior Publication Data
US 2020/0391801 A1    Dec. 17, 2020

(30) Foreign Application Priority Data
Jun. 14, 2019    (JP) .............................. JP2019-110883

(51) Int. Cl.
*B62D 25/04* (2006.01)
*B60J 5/04* (2006.01)

(52) U.S. Cl.
CPC ............ *B62D 25/04* (2013.01); *B60J 5/0443* (2013.01)

(58) Field of Classification Search
CPC ................................ B60J 5/0443; B62D 25/04
See application file for complete search history.

(56) References Cited

U.S. PATENT DOCUMENTS 7,976,098 B2 *    7/2011    Nishimura ............. B62D 25/04
                                                                        296/193.06

FOREIGN PATENT DOCUMENTS

JP            2010173562 A        8/2010

* cited by examiner

*Primary Examiner* — D Glenn Dayoan
*Assistant Examiner* — Melissa Ann Bonifazi
(74) *Attorney, Agent, or Firm* — Alleman Hall Creasman & Tuttle LLP (57) ABSTRACT

A vehicle side body structure having a pillar member including an upper member and a lower member that is joined to the upper member and has a rigidity lower than the upper member, the pillar member partitioning a side part opening of a body into a front part and a rear part; a side door disposed adjacently to the pillar member; and an impact bar provided in the side door, in which a front end portion of the impact bar overlaps with both the upper and lower members in side view while the side door is closed. The upper member has a reinforcing member and the front end portion of the impact bar covers a region of the upper member in which the reinforcing member is present, a region of the upper member in which the reinforcing member is not present, and the lower member in side view.

6 Claims, 10 Drawing Sheets

VEHICLE SIDE BODY STRUCTURE

TECHNICAL FIELD

The present invention relates to a vehicle side body structure having a pillar member in which an upper member is joined to a lower member and the relative positional relationship with an impact bar of a door is appropriately set.

BACKGROUND ART

Various structures for suppressing deformation of pillar members into the vehicle interior have been conventionally developed to ensure the safety of occupants at the time of a side collision of a vehicle. For example, in a side body structure of a vehicle described in Patent Document 1, approximately an upper two-thirds of a pillar reinforcement of a center pillar is formed by an upper member and a lower one-third of the pillar reinforcement is formed by a lower member, the upper member and the lower member are joined to each other, the cross-sectional shapes of the upper member and the lower member are made different so that the bending rigidity against bending toward the vehicle interior is different between the upper member and the lower member, the angle of bending deformation of the lower member is larger than the angle of bending deformation of the upper member as a deformation mode at the time of a side collision, thereby reducing the maximum amount of displacement of the center pillar into the vehicle interior.

Specifically, each of the upper member and the lower member has a side wall part extending along the side surface of the body and a pair of front and rear vertical wall parts extending toward the inside in a vehicle width direction from the front and rear ends of the side wall part. The pair of vertical wall parts of the lower member is inclined so that the interval of the pair of vertical wall parts is larger toward the inside in the vehicle width direction and the inclination angle of the vertical wall parts of the lower member is larger than in the vertical wall parts of the upper member.

In addition, structures for improving rigidity and absorbing an impact need to be provided in other portions of the body to address the case in which the center pillar does not behave as assumed.

In recent years, due to improvement of press molding technology, such as, for example, improvement of tailored blank technology, it is possible to integrate plate members having different thicknesses and different strengths or perform press molding with plate members superposed on each other to improve the rigidity of a part thereof. Application of such technology to the center pillar can improve the accuracy of deformation of the lower part and the upper part of the center pillar at the time of a side collision.

On the other hand, a door is disposed adjacently to the center pillar, an impact bar as a strength member is provided in this door, a part of a load applied to the door at the time of a side collision is transmitted to the center pillar via the impact bar, and the part of the load is supported by the center pillar.

PRIOR ART DOCUMENTS

Patent Documents

Patent Document 1: JP-2010-173562A

SUMMARY OF THE INVENTION

Problem to be Solved by the Invention

Since the pair of vertical wall parts of the lower member is inclined so that the interval of the pair of vertical wall parts is larger toward the inside in the vehicle width direction in the vehicle side body structure in Patent Document 1, the width in the vehicle front-rear direction of the lower member becomes large, thereby increasing the size of the center pillar.

However, to improve the accuracy of deformation of the center pillar at the time of a side collision while preventing an increase in the size of the center pillar, plate members having different thicknesses may be joined to each other, the plate members may be partially superposed on each other, or a plate member such as a high-tensile material that has different strength may be joined. Even in such a case, conditions having effects on the bending rigidity of the center pillar need to be set appropriately in advance.

In addition, the relative positional relationship between the impact bar and the center pillar also needs to be appropriately set in advance so that the center pillar can be deformed in a desired deformation mode when a collision load is applied to the center pillar from the impact bar of the door at the time of a side collision.

An object of the present invention is to provide a vehicle side body structure having a pillar member in which an upper member is joined to a lower member and the relative positional relationship with an impact bar of a door is appropriately set.

Means for Solving the Problem

According to the present invention, provided is a vehicle side body structure including a pillar member including an upper member and a lower member that is joined to the upper member and has a rigidity lower than the upper member, the pillar member partitioning a side part opening of a body into a front part and a rear part; a door disposed adjacently to the pillar member; and an impact bar provided in the door, in which a front end portion of the impact bar overlaps with both the upper member and the lower member in a vehicle side view in a state in which the door is closed.

In the structure described above, since the rigidity of the upper member is set higher than the rigidity of the lower member and the upper member undergoes bending deformation and mainly the lower member is crushed at the time of a side collision, the angle of bending deformation of the lower member toward the vehicle interior is larger than the angle of bending deformation of the upper member and a portion near the border between the upper member and the lower member intrudes into the vehicle interior at a maximum amount. Since the portion near the border between the upper member and the lower member comes close to the lower part by setting the length of the upper member longer than the length of the lower member, the amount of intrusion of the pillar member into the vehicle interior at the time of a side collision can be reduced.

Since the front end portion of the impact bar provided in the door overlaps with both the upper member and the lower member in the vehicle side view in the state in which the door is closed, the collision load applied to the impact bar at the time of a side collision acts on both the upper member and the lower member without concentrating on one of the upper member and the lower member, thereby stabilizing the behavior of the pillar member at the time of a side collision.

The present invention may have various preferred embodiments described below.

Preferably, the vehicle side body structure further includes a reinforcing member provided in the upper member and the front end portion of the impact bar covers a region of the upper member in which the reinforcing member is present, a region of the upper member in which the reinforcing member is not present, and the lower member in the vehicle side view (second aspect).

In this structure, since the front end portion of the impact bar overlaps with a structural discontinuous part including the border part through which a shift from the region in which the reinforcing member is present to the region in which the reinforcing member is not present is made and the border part in which the upper member is joined to the lower member, the pillar member can be deformed in a desired deformation mode by distributing the load from the impact bar to the upper member and the lower member at the time of a side collision.

Preferably, the pillar member has a harness pass-through opening and the front end portion of the impact bar covers at least a part of the harness pass-through opening in the vehicle side view (third aspect).

In this structure, the harnesses that pass through the opening can be protected by covering at least a part of the harness pass-through opening with the front end portion of the impact bar.

Preferably, each of the upper member and the lower member has a side wall part oriented in a vehicle front-rear direction and a pair of vertical wall parts that extend toward an inside in a vehicle width direction from front and rear ends of the side wall part, and the front end portion of the impact bar overlaps with the vertical wall parts on a vehicle rear side of the upper member and the rear member in the vehicle side view (fourth aspect).

In this structure, the load at the time of a side collision can be reliably transmitted to the upper member and the lower member by transmitting the load from the front end portion of the impact bar to the vertical wall parts on the vehicle rear side of the upper member and the lower member at the time of a side collision.

Advantage of the Invention

As described above, various effects can be obtained by the present invention.

MODES FOR CARRYING OUT THE INVENTION

An embodiment of a vehicle side body structure according to the present invention will be described below with reference to the drawings.

Figure 1:
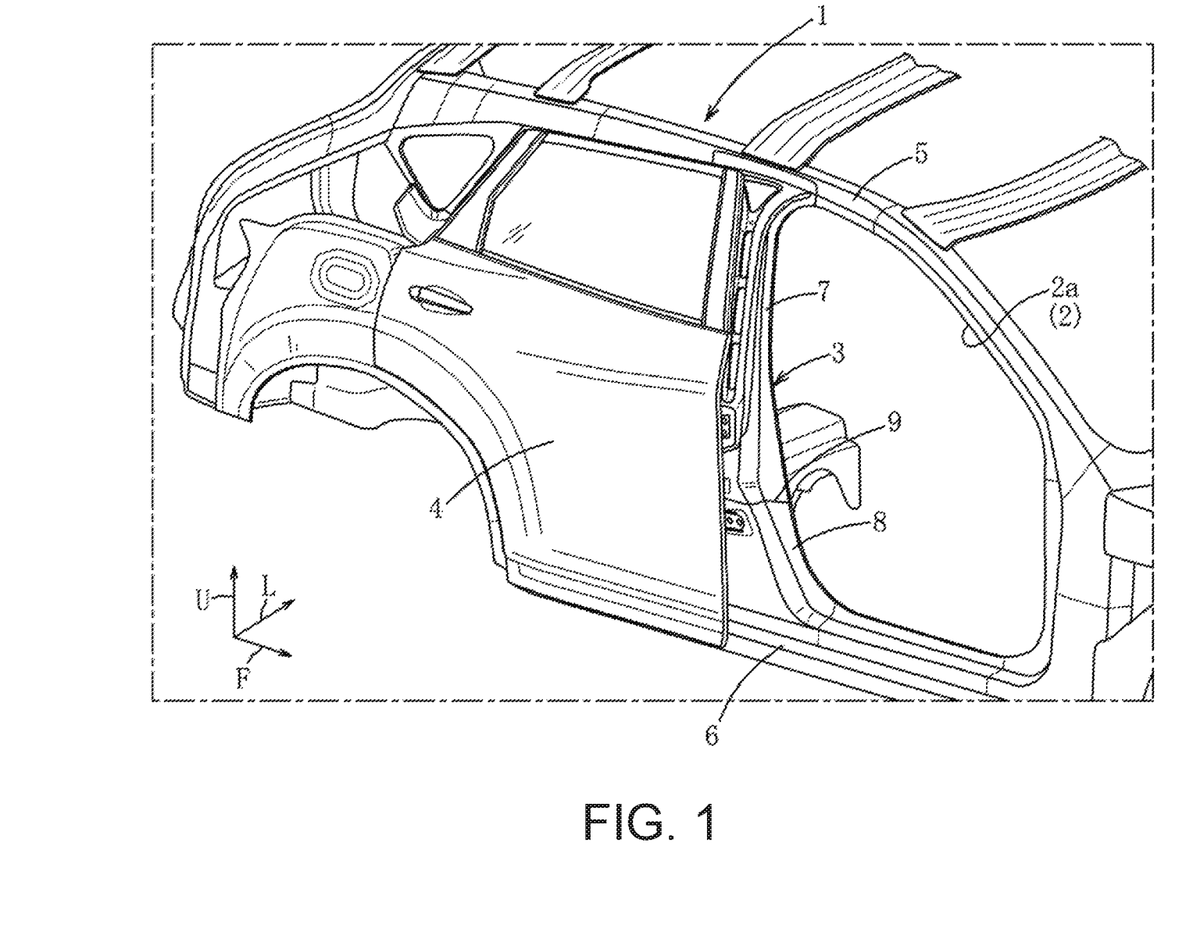
FIG. 1 is a perspective view illustrating a vehicle side body structure according to an embodiment of the present invention to which a door has been mounted.
Figure 2:
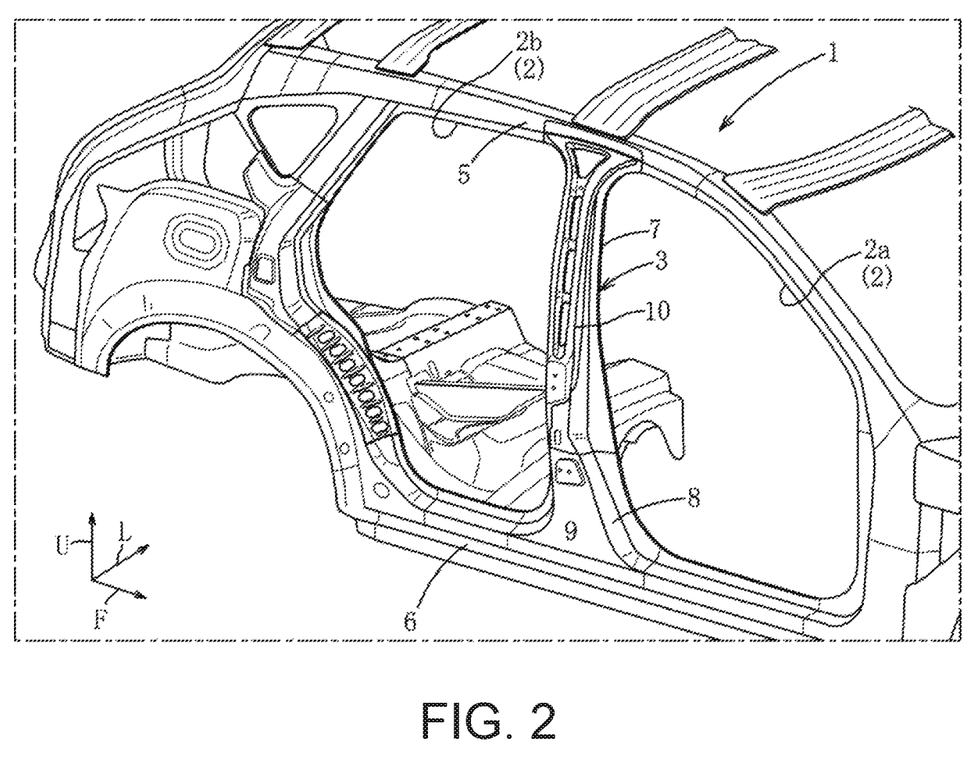
FIG. 2 is a perspective view illustrating the vehicle side body structure.
Figure 3:
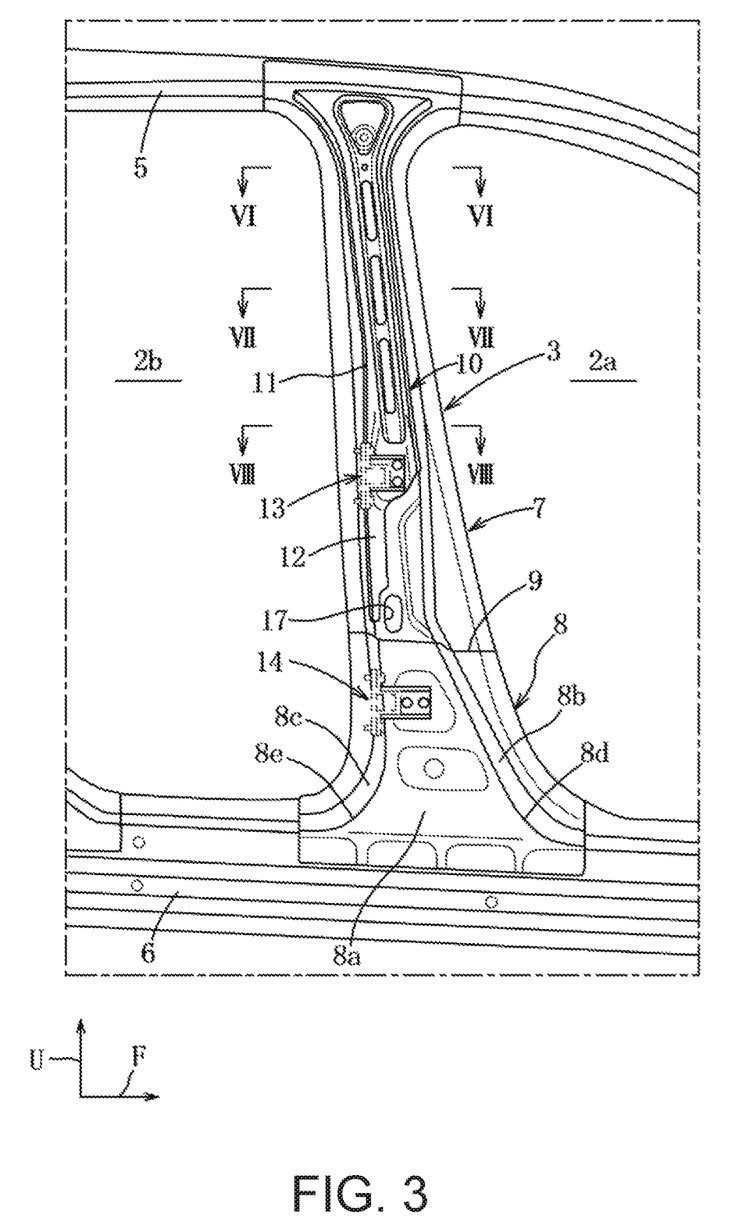
FIG. 3 is a side view illustrating a center pillar and a peripheral structure thereof.

FIGS. 1 to 3 illustrate a vehicle side body structure 1 of a 4-door sedan car, this vehicle side body structure 1 has a side part opening 2, this side part opening 2 is partitioned into a front side opening 2a and a rear side opening 2b by a pillar member 3 of a center pillar (not illustrated), and the front side opening 2a and the rear side opening 2b are closed by side doors 4 in an openable and closable manner. However, the side door for closing the front side opening 2a is not illustrated in FIG. 1. It should be noted here that arrows F, L, and U indicate the front side, the left side, and the upper side.

In the following description, the vehicle side body structure 1 on the right side of an automobile is assumed as an example.

The vehicle side body structure 1 has a roof side rail 5 and a side sill 6 that extend in the front-rear direction and these members form the upper side part and the lower side part of the side part opening 2. The middle parts in the front-rear direction of the roof side rail 5 and the side sill 6 are coupled to each other by the pillar member 3 extending in the up-down direction.

It should be noted here that the center pillar includes the pillar member 3 illustrated in FIGS. 1 and 2, an inner panel (not illustrated) joined to the inner surface inside in the vehicle width direction of this pillar member 3, and an outer panel (not illustrated) that covers the outer surface side of the pillar member 3. The center pillar is formed to have a larger front-rear width in the front-rear direction toward the lower portion. The upper end portion of the pillar member 3 is joined to the roof side rail 5 and the lower end portion of the pillar member 3 is joined to the side sill 6.

The pillar member 3 includes an upper member 7, a lower member 8 joined to the upper member 7 and having a rigidity lower than the upper member 7, and the lower end of the upper member 7 and the upper end of the lower member 8 are welded to each other in a joint line 9. The vertical length of the upper member 7 is longer than the vertical length of the lower member 8 and is, for example, approximately three-fourths (¾) of the whole length of the pillar member 3 and the vertical length of the lower member 8 is approximately one-quarter (¼) of the while length of the pillar member 3. However, the ratios described are not limited to ¾ and ¼.

The upper member 7 and the lower member 8 are formed by thin plate members made of high-tensile steel, the upper member 7 is formed by a plate member thicker than in the lower member 8, and the upper member 7 has a rigidity higher than the lower member 8.

As illustrated in FIGS. 6 to 8 and 10, the upper member 7 has a side wall part 7a oriented in the vehicle front-rear direction, a pair of front and rear vertical wall parts 7b and 7c extending toward the inside in the vehicle width direction from the front and rear ends of the side wall part 7a, and the joint parts between the side wall part 7a and the pair of vertical wall parts 7b and 7c are a pair of front and rear ridge parts 7d and 7e extending in the vehicle up-down direction. Similarly, as illustrated in FIGS. 3, 5, and 11, the lower member 8 has a side wall part 8a oriented in the vehicle front-rear direction and a pair of front and rear vertical wall parts 8b and 8c extending toward the inside in the vehicle width direction from the front and rear ends of the side wall part 8a and the joint parts between the side wall part 8a and the pair of vertical wall parts 8b and 8c are a pair of front and rear ridge parts 8d and 8e extending in the vehicle up-down direction.

Figure 4:
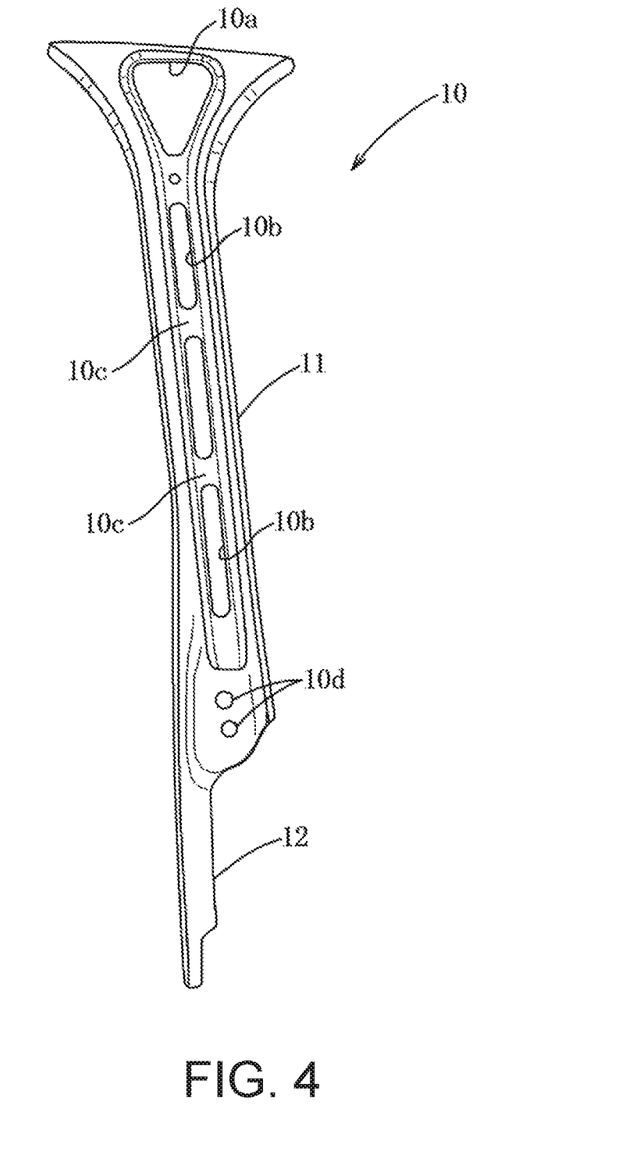
FIG. 4 is a side view illustrating a reinforcing member to be mounted to the center pillar.
Figure 5:
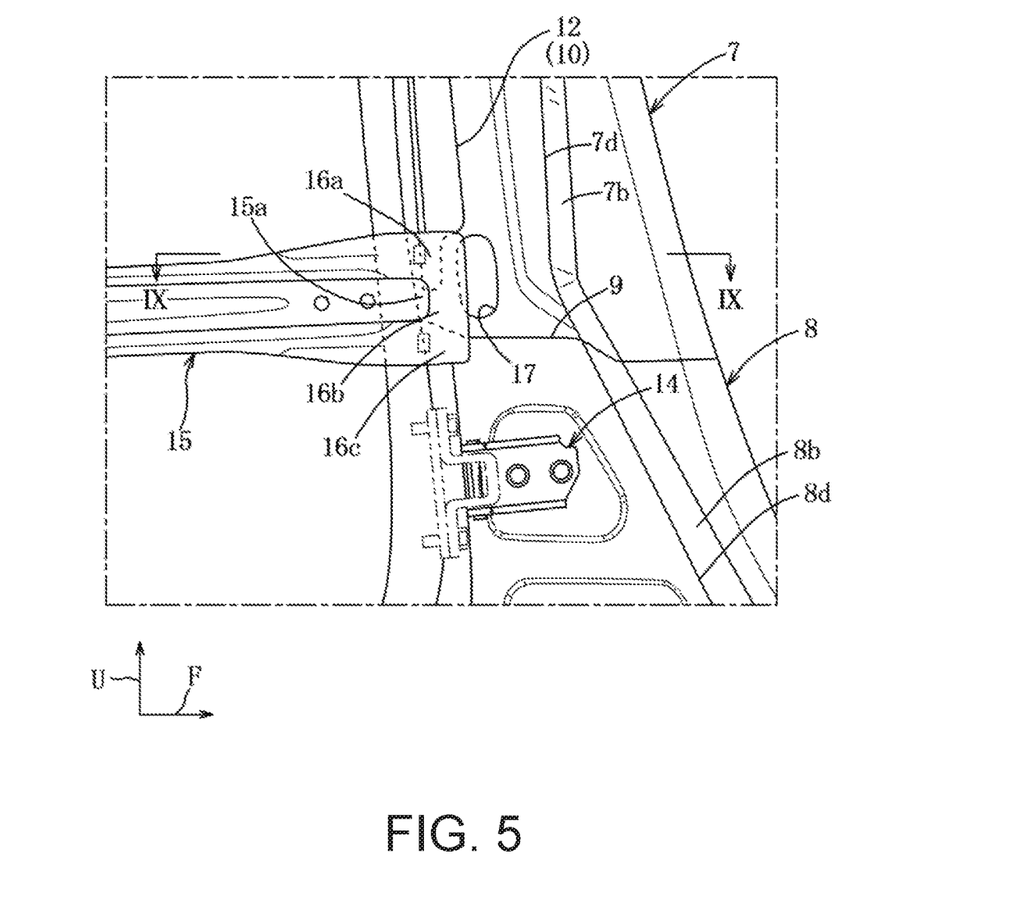
FIG. 5 is a side view illustrating the main parts of an impact bar mounted to the door and the center pillar.
Figure 6:
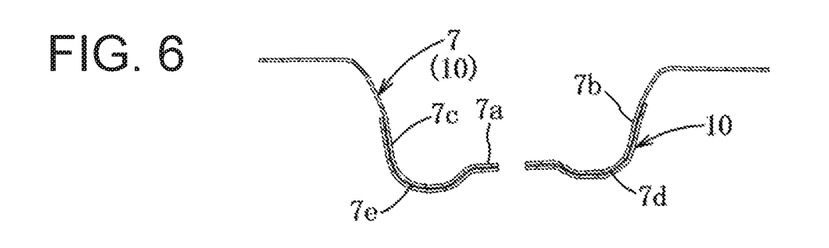
FIG. 6 is a cross-sectional view taken along line VI-VI in FIG. 3.
Figure 7:
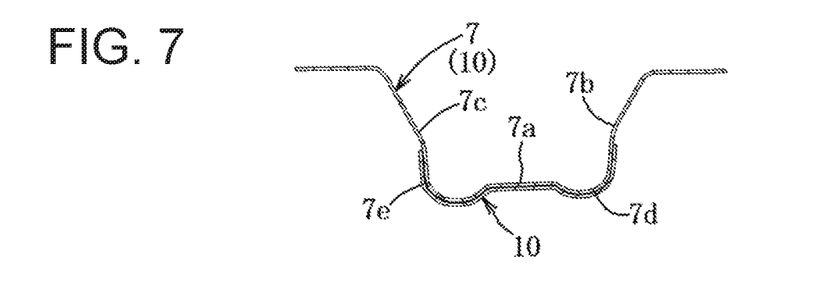
FIG. 7 is a cross-sectional view taken along line VII-VII in FIG. 3.
Figure 8:
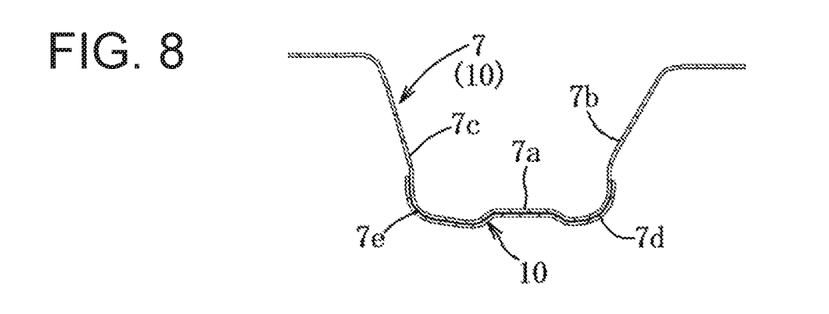
FIG. 8 is a cross-sectional view taken along line VIII-VIII in FIG. 3.

As illustrated in FIGS. 3 to 5, a reinforcing member 10 is welded to the outer surface in the vehicle width direction of the upper member 7. This reinforcing member 10 is formed by a thin plate member made of high-tensile steel with a higher tensile strength than the upper member 7 and the lower member 8. When the pillar member 3 is manufactured, the material of the reinforcing member 10 is welded to the surface of the material of the upper member 7, the upper end of the material of the lower member 8 is welded to the lower end of the material of the upper member 7, and these materials are press-molded by tailored blank technology.

The upper end portion of the reinforcing member 10 and the upper end portion of the upper member 7 are joined to the roof side rail 5. The reinforcing member 10 has a wide part 11 that straddles the pair of front and rear ridge parts 7d and 7e of the upper member 7 and a narrow part 12 that extends downward from the wide part 11 and covers only one of the front and rear ridge parts (rear ridge part 7e in the embodiment) 7d and 7e. The front-rear width in the front-rear direction of the wide part 11 is set larger than the front-rear width in the front-rear direction of the narrow part 12. The vertical length of the wide part 11 is, for example, approximately three-fourths of the whole length of the reinforcing member 10 and the vertical length of the narrow part 12 is, for example, approximately one-quarter of the whole length of the reinforcing member 10.

It should be noted here that a triangular opening 10a is formed in the portion of the wide part 11 close to the upper end and three long openings 10b are formed in series with bridge parts 10c provided therebetween in the portion extending downward from this opening 10a.

The bending rigidity of the reinforcing member 10 against bending toward the inside in the vehicle width direction is adjusted via the openings 10a and 10b described above.

As illustrated in FIG. 4, since the bending rigidity of the reinforcing member 10 against bending toward the inside in the vehicle width direction is set via the front-rear width in the vehicle front-rear direction, the lower half of the reinforcing member 10 is shaped to have a gradually smaller bending rigidity against bending toward the inside in the vehicle width direction toward the lower part of the reinforcing member 10.

Although the front-rear width of the side wall part 7a of the upper member 7 has effects on the bending rigidity of the upper member 7, the front-rear width of the side wall part 7a is maximized in the vicinity of a hinge coupling part 13 and reduces toward the lower part from the vicinity of the hinge coupling part 13.

Figure 10:
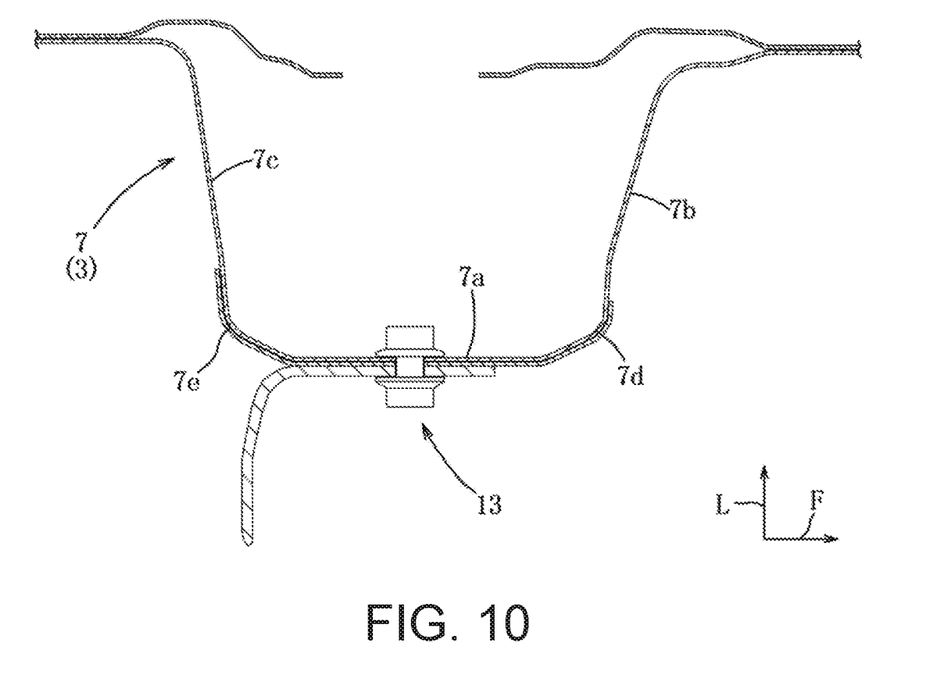
FIG. 10 is a cross-sectional view illustrating the center pillar in the position of an upper door hinge.
Figure 11:
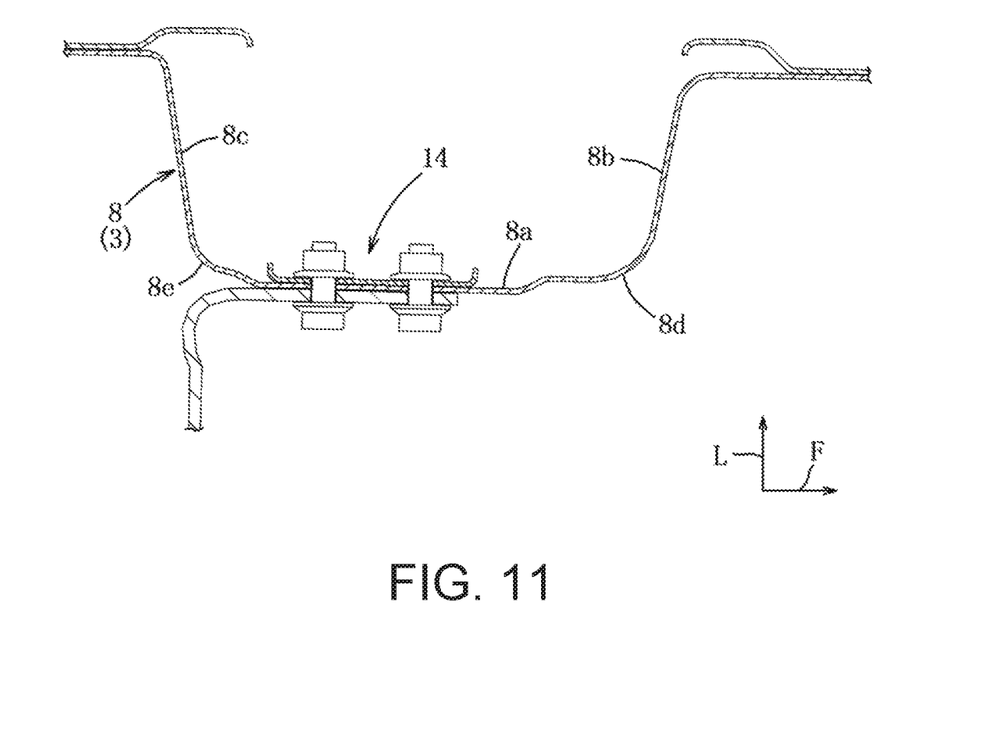
FIG. 11 is a cross-sectional view illustrating the center pillar in the position of a lower door hinge.

As illustrated in FIGS. 3, 10 and 11, the pillar member 3 has two hinge coupling parts 13 and 14 to which a hinge that supports the side door 4 is coupled, and the portion of the reinforcing member 10 that corresponds to the upper hinge coupling part 13 is formed by the lower end portion of the wide part 11 and the narrow part 12 extends downward from the lower end portion of this wide part 11. The lower end portion of the wide part 11 has two bolt holes 10d for the upper hinge coupling part 13. The lower hinge coupling part 14 is formed in the vicinity of the upper end of the lower member 8.

Figure 9:
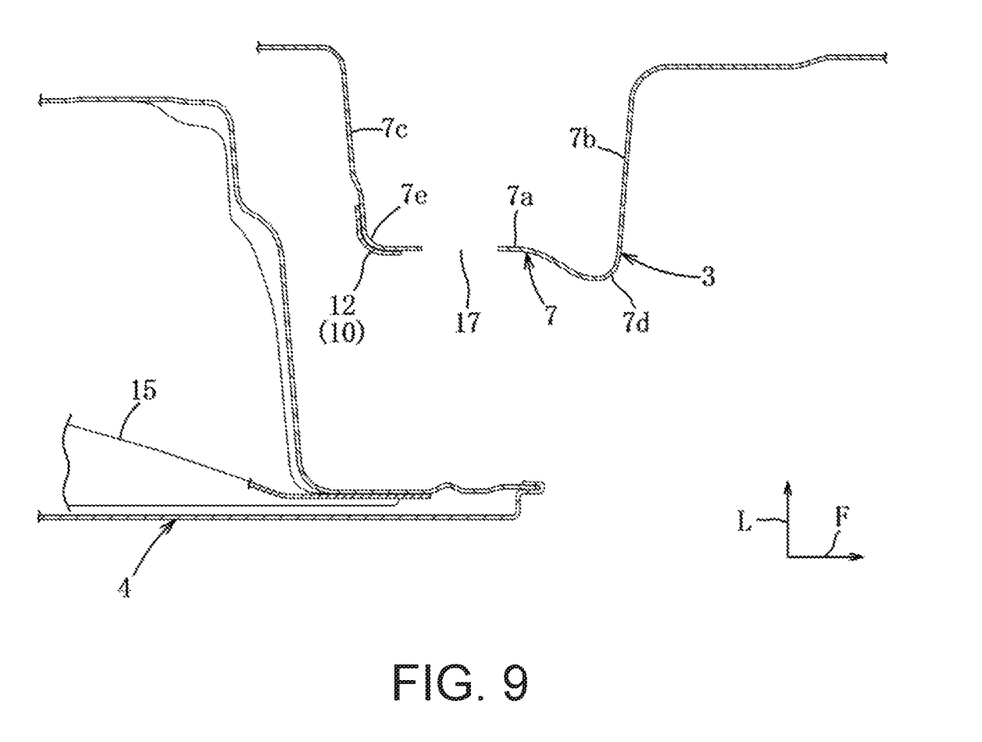
FIG. 9 is a cross-sectional view illustrating the main part including a cross-sectional view taken along line IX-IX in FIG. 5.

As illustrated in FIGS. 5 and 9, in the side door 4 disposed adjacently to the pillar member 3, an impact bar 15 that ensures the rigidity of the portion of the side door 4 near the beltline and transmits a side collision load to the pillar member 3 is provided. In the state in which the side door 4 is closed, a front end portion 15a of the impact bar 15 overlaps with the upper member 7 and the lower member 8 in a vehicle side view.

To reliably transmit the side collision load from the impact bar 15 to the upper member 7 and the lower member 8, the front end portion 15a of the impact bar 15 overlaps with the vertical wall parts 7c and 8c on the vehicle rear side of the upper member 7 and the lower member 8 in the vehicle side view.

As illustrated in FIG. 5, so as to distribute the side collision load applied to the pillar member 3 from the impact bar 15 to the upper member 7 and the lower member 8, the front end portion 15a of the impact bar 15 has a region 16a of the upper member 7 in which the reinforcing member 10 is present, a region 16b of the upper member 7 in which the reinforcing member 10 is not present, and a region 16c that covers the lower member 8 in the vehicle side view.

As illustrated in FIGS. 3 and 5, the pillar member 3 has a harness pass-through opening 17 through which harnesses for a power window and a speaker and the front end portion 15a of the impact bar 15 covers at least a part of the harness pass-through opening 17 in the vehicle side view to protect the harnesses. The opening 17 is formed in the vicinity of the lower end of the upper member 7, that is, the vicinity of the joint line 9 and this opening 17 appropriately reduces the bending rigidity of the upper member 7.

Next, the operation and the effect of the vehicle side body structure 1 described above will be described.

Since the rigidity of the upper member 7 is set higher than the rigidity of the lower member 8 and this upper member 7 has the reinforcing member 10 made of high-tensile steel, the rigidity of the upper member 7 and the reinforcing member 10 is higher than that of the lower member 8. Since the lower half of the reinforcing member 10 is shaped to have a smaller bending rigidity against bending toward the inside in the vehicle width direction toward the lower part of the reinforcing member 10, the bending rigidity of the lower member 8 is set smaller than the bending rigidity of the upper member 7 and the reinforcing member 10 while ensuring the continuity of the bending rigidity across the whole length of the upper member 7. Since the bending rigidity of the upper member 7 can be adjusted via the reinforcing member 10, a weight reduction in the pillar member 3 can be achieved.

Accordingly, since the upper member 7 undergoes bending deformation and mainly the lower member 8 is crushed when a side collision load is applied, the angle of bending deformation of the lower member 8 toward the vehicle interior is larger than the angle of bending deformation of the upper member 7 and a portion near the border between the upper member 7 and the lower member 8 intrudes into the vehicle interior at a maximum amount.

Since the border portion between the upper member 7 and the lower member 8 comes close to the lower part by setting the length of the upper member 7 longer than the length of the lower member 8, the maximum amount of intrusion of the pillar member 3 into the vehicle interior at the time of a side collision can be reduced. As described above, since the roles of the upper member 7 and the lower member 8 at the time of a side collision are divided and the difference between the strengths thereof do not become so large, the behavior of the pillar member 3 at the time of a side collision becomes stable.

Figure 12:
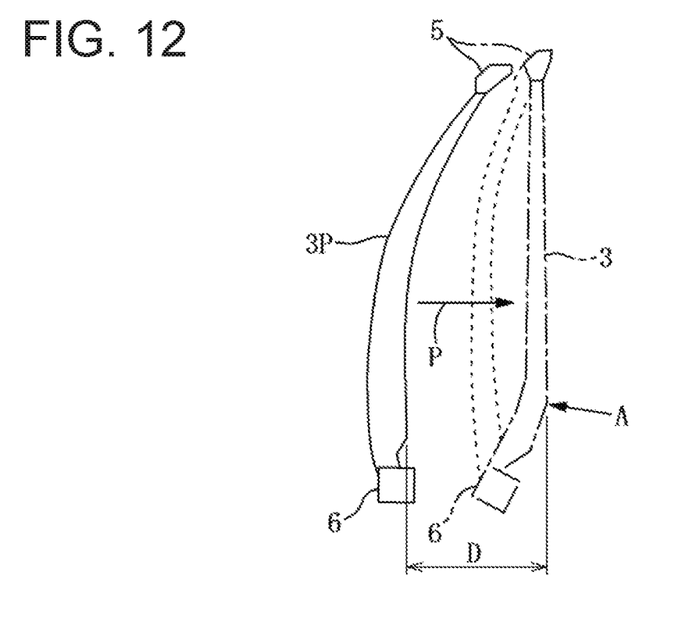
FIG. 12 is an explanatory diagram used to describe a deformation mode of the door.

Specifically, as illustrated in FIG. 12, when a side collision load is applied to a center pillar 3P from the outside in the vehicle width direction as indicated by an arrow P, the roof side rail 5 and the side sill 6 move toward the inside in the vehicle width direction and the pillar member 3 is deformed to the state indicated by the dot-dash line through the state indicated by the dotted line.

The deformation mode of the pillar member 3 at this time enters the state in which a gradual bending occurs in a border part A between the upper member 7 and the lower member 8, the upper member 7 undergoes bending deformation toward the vehicle interior and the lower member 8 is deformed toward the vehicle interior mainly in a crushed manner, and the angle of the bending deformation of the lower member 8 is larger than the angle of the bending deformation of the upper member 7. Accordingly, an amount D of intrusion of the pillar member 3 into the vehicle interior in the border part A is maximized.

Figure 13:
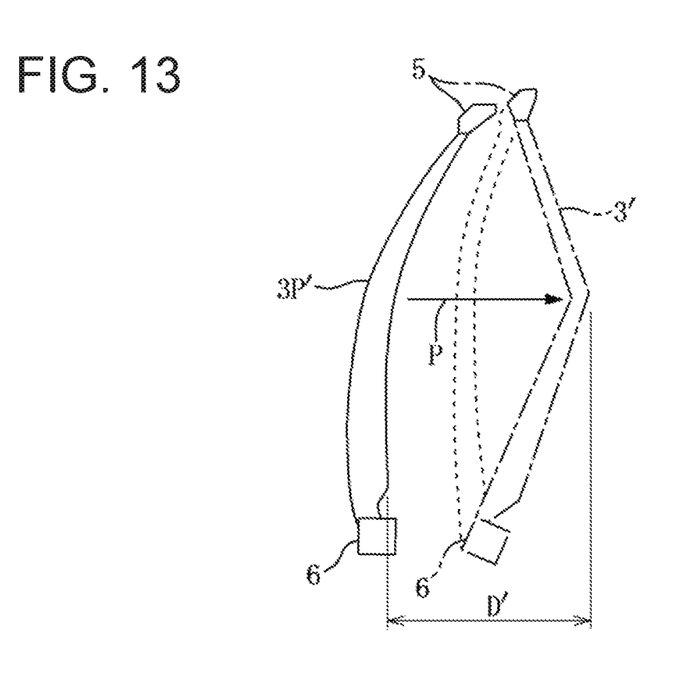
FIG. 13 is an explanatory diagram used to describe a deformation mode of the door according to a comparative example.

FIG. 13 illustrates the deformation mode according to a comparative example in which a middle part of a pillar member 3' of a center pillar 3P' is sharply bent. An amount D' of intrusion of the pillar member 3' into the vehicle interior in this case is significantly larger than the amount D of intrusion in FIG. 12.

Since the bending rigidity of the reinforcing member 10 against bending toward the inside in the vehicle width direction is set via the front-rear width in the vehicle front-rear direction, the bending rigidity can be set freely by adjusting the front-rear width of the reinforcing member 10.

Since the reinforcing member 10 has the wide part 11 that straddles the pair of front and rear ridge parts 7d and 7e and the narrow part 12 that extends downward from this wide part 11 and covers only one (rear ridge part 7e in the embodiment) of the front and rear ridge parts 7d and 7e, the upper member 7 can be reinforced by using the reinforcing member 10 at minimum while ensuring the integrity of the reinforcing member 10.

Since the portion of the reinforcing member 10 corresponding to the upper hinge coupling part 13 is formed by the lower end portion of the wide part 11 and the narrow part 12 extends downward from the lower end portion of this wide part 11, the above effects can be obtained while suppressing intrusion of the pillar member 3 near the beltline corresponding to the upper hinge coupling part 13 into the vehicle interior at the time of a side collision.

Since the front end portion 15a of the impact bar 15 provided in the side door 4 overlaps with both the upper member 7 and the lower member 8 in the vehicle side view when the side door 4 is closed, the collision load applied to the impact bar 15 at the time of a side collision acts on both the upper member 7 and the lower member 8 without concentrating on one of the upper member 7 and the lower member 8, thereby stabilizing the behavior of the pillar member 3 at the time of a side collision and deforming the pillar member 3 in a desired deformation mode.

Since the front end portion 15a of the impact bar 15 covers the region 16a of the upper member 7 in which the reinforcing member 10 is present, the region 16b of the upper member 7 in which the reinforcing member 10 is not present, and the lower member 8 in the vehicle side view, and the front end portion 15a of the impact bar 15 overlaps with a structural discontinuous part including the border part through which a shift from the region 16a in which the reinforcing member 10 is present to the region 16b in which the reinforcing member 10 is not present is made and the border part in which the upper member 7 is joined to the lower member 8, the pillar member 3 can be deformed in a desired deformation mode by distributing the load from the impact bar 15 to the upper member 7 and the lower member 8 at the time of a side collision.

Since the pillar member 3 has the harness pass-through opening 17 and the front end portion 15a of the impact bar 15 covers at least a part of the harness pass-through opening 17 in the vehicle side view, the harnesses that pass through the opening 17 can be protected by the front end portion 15a of the impact bar 15.

Since the front end portion 15a of the impact bar 15 overlaps with the vertical wall parts 7c and 8c on the vehicle rear side of the upper member 7 and the lower member 8 in the vehicle side view, the load at the time of a side collision can be reliably transmitted to the upper member 7 and the lower member 8 by transmitting the load from the front end portion 15a of the impact bar 15 to the vertical wall parts 7c and 8c on the vehicle rear side of the upper member 7 and the lower member 8 at the time of a side collision.

Next, examples in which the embodiment is partially modified will be described.

1) Although the upper member, the lower member, and the reinforcing member of the pillar member have been formed by members made of high-tensile steel, the lower member may be formed by a member made of normal steel. The material of the pillar member is not limited to the material in the embodiment described above.

2) Although the reinforcing member has been formed by a single member, the reinforcing member may be formed by a plurality of members.

3) Other than the above, those skilled in the art may make an addition to the embodiment described above as appropriate.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: vehicle side body structure
2: side part opening
3: pillar member
4: side door
7: upper member
7a: side wall part 7b, 7c: vertical wall part
7d, 7e: ridge part
8: lower member
8a: side wall part
8b, 8c: vertical wall part
8d, 8e: ridge part
10: reinforcing member
11: wide part
12: narrow part
13, 14: hinge coupling part
15: impact bar
15a: front end portion
16a: region in which reinforcing member is present
16b: region in which reinforcing member is not present

The invention claimed is:

1. A vehicle side body structure comprising:
a pillar member including an upper member and a lower member that is joined to the upper member and has a rigidity lower than the upper member, the pillar member partitioning a side part opening of a body into a front part and a rear part;
a door disposed adjacently to the pillar member;
an impact bar provided in the door; and
a reinforcing member attached to an outer surface of the upper member in a vehicle width direction,
wherein a front end portion of the impact bar overlaps with both the upper member and the lower member in a vehicle side view in a state in which the door is closed, and
wherein the front end portion of the impact bar covers a region of the upper member in which the reinforcing member is present, a region of the upper member in which the reinforcing member is not present, and the lower member in the vehicle side view.

2. The vehicle side body structure according to claim 1, wherein the pillar member has a harness pass-through opening that is formed in the upper member and the front end portion of the impact bar covers at least a part of the harness pass-through opening in the vehicle side view.

3. The vehicle side body structure according to claim 1, wherein each of the upper member and the lower member has a side wall part oriented in a vehicle front-rear direction and a pair of vertical wall parts that extend toward an inside in the vehicle width direction from front and rear ends of the side wall part, and
the front end portion of the impact bar overlaps with the vertical wall parts on a vehicle rear side of the upper member and the rear member in the vehicle side view.

4. The vehicle side body structure according to claim 1, wherein the upper member has a side wall part oriented in a vehicle front-rear direction and a pair of front and rear vertical wall parts extending toward an inside in the vehicle width direction from front and rear ends of the side wall part, the vehicle side body structure further comprising:
a pair of front and rear ridge parts extending in a vehicle up-down direction and serving as joint parts between the side wall part and the pair of vertical wall parts, wherein
the reinforcing member has a wide part that straddles the pair of front and rear ridge parts and a narrow part that extends downward from the wide part and covers only one of the front and rear ridge parts.

5. The vehicle side body structure according to claim 4, wherein the front end portion of the impact bar covers a portion of the narrow part of the reinforcing member in the vehicle side view.

6. A vehicle side body structure comprising:
a pillar member including an upper member and a lower member that is joined to the upper member and has a rigidity lower than the upper member, the pillar member partitioning a side part opening of a body into a front part and a rear part;
a door disposed adjacently to the pillar member; and
an impact bar provided in the door, wherein
a front end portion of the impact bar overlaps with both the upper member and the lower member in a vehicle side view in a state in which the door is closed,
the pillar member has a harness pass-through opening that is formed in the upper member, and
the front end portion of the impact bar covers at least a part of the harness pass-through opening in the vehicle side view.

* * * * *